US010257498B2

(12) United States Patent
Cronie (10) Patent No.: US 10,257,498 B2
(45) Date of Patent: Apr. 9, 2019

(54) COORDINATION OF MULTIPLE STRUCTURED LIGHT-BASED 3D IMAGE DETECTORS

(71) Applicant: EMPIRE TECHNOLOGY DEVELOPMENT LLC, Wilmington, DE (US)

(72) Inventor: Harm Stefan Cronie, Poliez-le-Grand (CH)

(73) Assignee: Empire Technology Development LLC, Wilmington, DE (US)

( * ) Notice: Subject to any disclaimer, the term of this patent is extended or adjusted under 35 U.S.C. 154(b) by 390 days.

(21) Appl. No.: 14/959,000

(22) Filed: Dec. 4, 2015

(65) Prior Publication Data

US 2017/0163969 A1    Jun. 8, 2017

(51) Int. Cl.
*H04N 13/02*       (2006.01)
*G06K 9/46*        (2006.01)
(Continued)

(52) U.S. Cl.
CPC ....... *H04N 13/271* (2018.05); *G01B 11/2513* (2013.01); *G01C 11/06* (2013.01); *G06K 9/2036* (2013.01); *G06K 9/46* (2013.01); *H04N 13/128* (2018.05); *H04N 13/25* (2018.05); *H04N 13/254* (2018.05); *G06K 2009/00583* (2013.01); *H04N 2013/0081* (2013.01)

(58) Field of Classification Search
CPC ........... H04N 13/0022; H04N 13/0271; H04N 13/025; H04N 13/0253; G06K 9/46; G06K 2009/00583
See application file for complete search history.

(56) References Cited

U.S. PATENT DOCUMENTS 5,543,848 A * 8/1996 Murakami ........... H04N 19/503
                                                  348/409.1
5,877,803 A * 3/1999 Wee ....................... H04N 7/181
                                                  348/135

(Continued)

OTHER PUBLICATIONS

Maimone, A., and Fuchs, H., "Reducing Interference Between Multiple Structured Light Depth Sensors Using Motion," 2012 IEEE Virtual Reality Short Papers and Posters (VRW), pp. 51-54 (Mar. 4-8, 2012).

(Continued)

*Primary Examiner* — Obafemi O Sosanya (57) ABSTRACT

Technologies are generally described for coordination of structured light-based image detectors. In some examples, one or more structured light sources may be configured to project sets of points onto the scene. The sets of points may be arranged into disjoint sets of geometrical shapes such as lines, where each geometrical shape includes a subset of the points projected by an illumination source. A relative position and or a color of the points in each geometrical shape may encode an identification code with which each illumination source may be identified. Thus, even when the point clouds projected by each of the illumination sources overlap, the geometrical shapes may still be detected, and thereby a corresponding illumination source may be identified. A depth map may then be estimated based on stereo vision principles or depth-from-focus principles by one or more image detectors.

22 Claims, 8 Drawing Sheets

(51) Int. Cl.
   *G01C 11/06*    (2006.01)
   *H04N 13/00*    (2018.01)
   *H04N 13/271*   (2018.01)
   *H04N 13/128*   (2018.01)
   *G06K 9/20*     (2006.01)
   *G01B 11/25*    (2006.01)
   *H04N 13/254*   (2018.01)
   *H04N 13/25*    (2018.01)
   *G06K 9/00*     (2006.01)

(56) References Cited

U.S. PATENT DOCUMENTS

| | | |
|---|---|---|
| 8,172,407 B2 | 5/2012 | Lim |
| 8,811,767 B2 | 8/2014 | Veeraraghavan et al. |
| 8,866,391 B2 | 10/2014 | Ganick et al. |
| 2012/0194650 A1 | 8/2012 | Izadi et al. |
| 2012/0196679 A1* | 8/2012 | Newcombe ............. A63F 13/06 463/36 |
| 2014/0189720 A1* | 7/2014 | Terrazas ........... H04N 21/44218 725/12 |
| 2014/0315570 A1* | 10/2014 | Yun ....................... H04W 4/043 455/456.1 |

OTHER PUBLICATIONS

Wang, J., et al., "3D scene reconstruction by multiple structured-light based commodity depth cameras," 2012 IEEE International Conference on Acoustics, Speech and Signal Processing (ICASSP), pp. 5429-5432 (Mar. 25-30, 2012).

Yan, Z., et al., "Beyond the interference problem: hierarchical patterns for multiple-projector structured light system," Applied Optics, vol. 53, Issue 17, pp. 3621-3632 (Jun. 2014).

International Search Report and Written Opinion for International Patent Application No. PCT/US2016/059964, dated Jan. 24, 2017, 7 pages.

\* cited by examiner

```
┌─────────────────────────────────────────────────────────────────┐
│ COMPUTER PROGRAM PRODUCT 800                                    │
│                                                                 │
│  ┌───────────────────────────────────────────────────────────┐  │
│  │ SIGNAL-BEARING MEDIUM 802                                 │  │
│  │                                                           │  │
│  │  ┌─────────────────────────────────────────────────────┐  │  │
│  │  │ 804 ONE OR MORE INSTRUCTIONS TO                     │  │  │
│  │  │                                                     │  │  │
│  │  │ RECEIVE AN IMAGE OF A TARGET OBJECT;                │  │  │
│  │  │ DETECT MULTIPLE PATTERN ELEMENTS PROJECTED          │  │  │
│  │  │ ONTO THE TARGET OBJECT IN THE IMAGE;                │  │  │
│  │  │ DETECT ONE OR MORE PATTERNS FROM THE DETECTED       │  │  │
│  │  │ PATTERN ELEMENTS;                                   │  │  │
│  │  │ EXTRACT ONE OR MORE IDENTIFIERS FROM THE ONE OR     │  │  │
│  │  │ MORE DETECTED PATTERNS; AND                         │  │  │
│  │  │ ASSOCIATE THE ONE OR MORE PATTERNS WITH ONE OR      │  │  │
│  │  │ MORE IMAGE DETECTORS OR PATTERN PROJECTORS          │  │  │
│  │  │ BASED ON THE EXTRACTED ONE OR MORE IDENTIFIERS.     │  │  │
│  │  └─────────────────────────────────────────────────────┘  │  │
│  │                                                           │  │
│  │   ┌──────────────┐  ┌──────────────┐  ┌──────────────┐    │  │
│  │   │ COMPUTER-    │  │ RECORDABLE   │  │COMMUNICATIONS│    │  │
│  │   │ READABLE     │  │ MEDIUM       │  │ MEDIUM       │    │  │
│  │   │ MEDIUM       │  │ 808          │  │ 810          │    │  │
│  │   │ 806          │  │              │  │              │    │  │
│  │   └──────────────┘  └──────────────┘  └──────────────┘    │  │
│  └───────────────────────────────────────────────────────────┘  │
└─────────────────────────────────────────────────────────────────┘
```

FIG. 8

COORDINATION OF MULTIPLE STRUCTURED LIGHT-BASED 3D IMAGE DETECTORS

BACKGROUND

Unless otherwise indicated herein, the materials described in this section are not prior art to the claims in this application and are not admitted to be prior art by inclusion in this section.

Machine vision for robotic applications may involve three-dimensional (3D) imaging by depth cameras or 3D cameras. Depth cameras may enable a robot to acquire a 3D image of its environment which may be used to acquire situational awareness or recognize objects from their shape. Some depth camera design approaches may employ structured light used together with stereovision principles, for example, to acquire a depth map.

One of the shortcomings of structured light-based depth cameras is that only a single depth camera can properly operate in a scene. When two structured light-based depth cameras project a pattern of points onto a scene, their patterns may interfere. To address pattern interference synchronization between the different 3D cameras may be used, but such synchronization may not always be available or desired.

SUMMARY

The present disclosure generally describes techniques for coordination of multiple structured light-based 3D image detectors.

According to some embodiments, a method to coordinate multiple structured light-based 3D image detectors is described. The method may include receiving an image of a target object; detecting a plurality of pattern elements projected onto the target object in the image; detecting one or more patterns from the detected plurality of the pattern elements; extracting one or more identifiers from the one or more detected patterns; and associating the one or more patterns with one or more image detectors or pattern projectors based on the extracted one or more identifiers.

According to other examples, a system to coordinate multiple structured light-based 3D image detectors is described. The system may include a pattern projector configured to encode two or more image detector identifiers onto sets of plurality of patterns and project the sets of plurality of patterns onto a target object. The system may also include two or more spatially separated image detectors configured to capture an image of the target object with the sets of plurality of patterns projected onto the target object. The system may further include a detection control module configured to receive the image of the target object with the sets of plurality of patterns projected onto the target object; detect the sets of plurality of patterns projected onto the target object; detect a plurality of pattern elements from the detected sets of plurality of patterns; extract the two or more image detector identifiers from the sets of plurality of patterns and the plurality of pattern elements; and associate each of the sets of plurality of patterns with each of the two or more image detectors based on the extracted two or more image detector identifiers.

According to further examples, a system to coordinate multiple structured light-based 3D image detectors is described. The system may include two or more spatially separated pattern projectors configured to encode a plurality of identifiers onto sets of plurality of patterns, where each set of the plurality of patterns is encoded with one identifier; and project the sets of plurality of patterns onto a target object. The system may also include an image detector configured to capture an image of the target object with the sets of plurality of patterns projected onto the target object. The system may further include a detection control module configured to receive the image of the target object with the sets of plurality of patterns projected onto the target object; detect the sets of plurality of patterns projected onto the target object; detect a plurality of pattern elements from the detected sets of plurality of patterns; extract the plurality of identifiers from the sets of plurality of patterns and the plurality of pattern elements; and associate each of the sets of plurality of patterns with each of the two or more pattern projectors based on the extracted plurality of identifiers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to coordination of multiple structured light-based 3D image detectors to extract depth maps.

Briefly stated, technologies are generally described for coordination of structured light-based image detectors to extract depth maps. In some examples, one or more structured light sources may be configured to project sets of points onto the scene. The sets of points may be arranged into disjoint sets of geometrical shapes such as lines, where each geometrical shape includes a subset of the points projected by an illumination source. A relative position and or a color of the points in each geometrical shape may encode an identification code with which each illumination source may be identified. Thus, even when the point clouds projected by each of the illumination sources overlap, the geometrical shapes may still be detected, and thereby a corresponding illumination source may be identified. A depth map may then be estimated based on stereovision principles or depth-from-focus principles by one or more image detectors.

Figure 1:
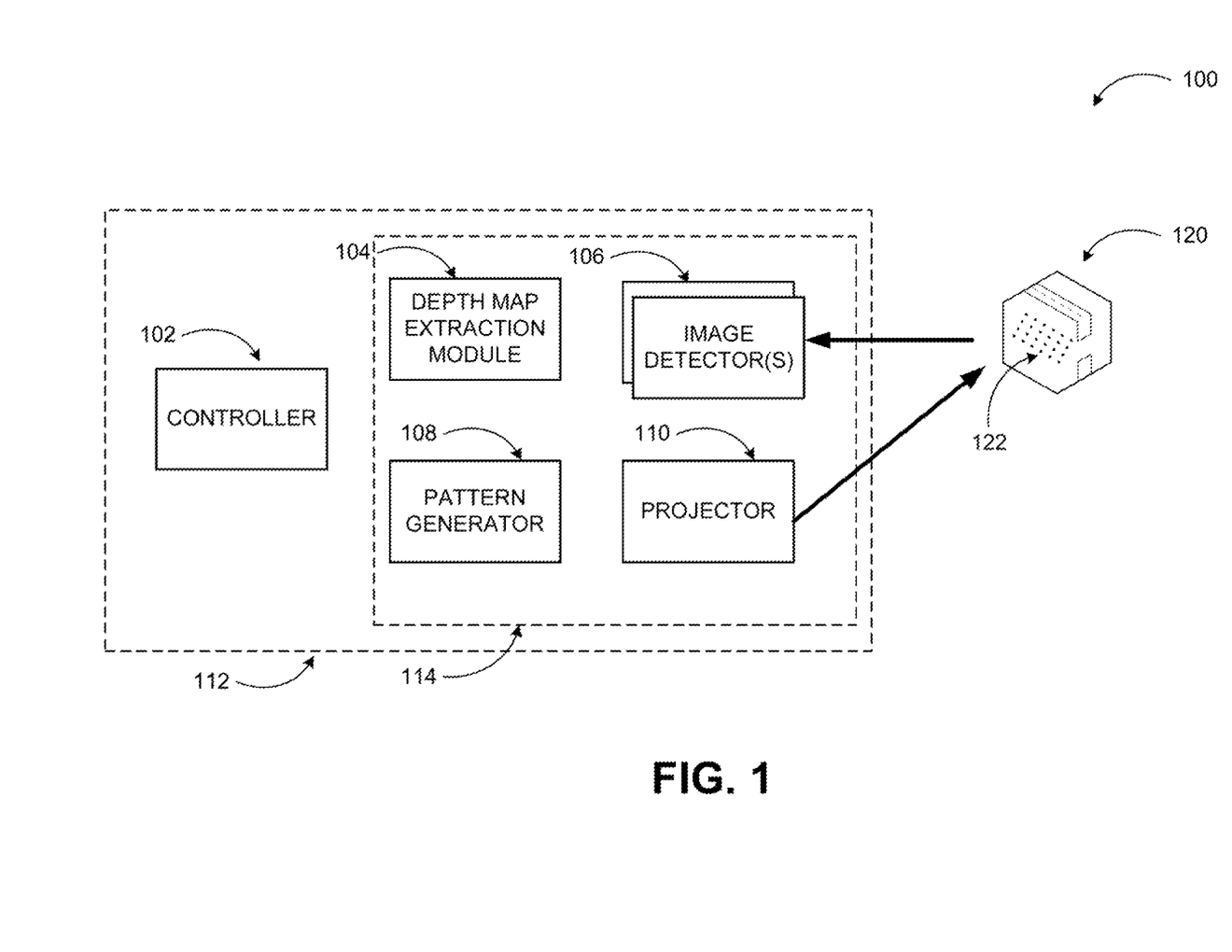
FIG. 1 illustrates an example system for coordination of multiple structured light-based 3D image detectors with different configurations.

FIG. 1 illustrates an example system for coordination of multiple structured light-based 3D image detectors with different configurations, arranged in accordance with at least some embodiments described herein.

As mentioned above, machine vision for robotic applications may involve 3D imaging by use of depth cameras or 3D cameras, which may enable a robot to acquire a 3D image of its environment and use information from the acquired 3D image to obtain situational awareness or recognize objects from their shapes. One example of a suitable depth camera design includes Lidar-based systems that project a cloud of dots onto a scene. The projection may be performed by mechanically actuating a mirror to steer a laser beam. The time-of-flight may then be measured for each projected laser dot and a depth map may be extracted from the measurements. Another example includes time-of-flight sensors that may be used in combination with infrared (IR) illumination to acquire a depth map of a scene. Compared to Lidar-based systems, the scene may be illuminated at once as opposed to the illumination being in a scanning fashion as used in Lidar-based systems. The time-of-flight sensors may include arrays of pixel sensors to provide spatial resolution. A further example includes stereovision, which may be used with suitable processing to acquire a depth map of a scene. Stereovision may not require its own illumination, but may not work well on smooth surfaces. Yet another example is the use of structured light together with, for example, stereovision principles to acquire a depth map.

In structured light-based approaches, a simple sensor and a projector may suffice to extract a depth map of a scene at reasonable cost. The projector may be used to project a pattern onto the scene, which may be observed by one or more image detectors. Depending on the type of pattern projected, a parallax effect between the projector and the image detectors and/or a parallax effect between two images recorded from two sensors (stereovision) may be used to extract the depth map. The projected pattern may be designed in such a way that its spatial parts can be detected reliable in the scene; thus, providing an absolute basis for spatial locations in the scene as recorded by the image detectors.

The patterns may be relatively complex in nature and, for example, use different colors. This may require the projector to be complex, that is, capable of generating and/or projecting complex patterns. Another option may be to project a relatively simple point cloud with pseudo-random characteristics. Such simple patterns may be relatively easy to generate, and may be projected with non-visible light, such as infrared (IR). The image detectors may then use a filter to attenuate background illumination improving contrast and leading to more accurate depth maps. A challenge with structured light-based depth cameras is that typically a single depth camera can operate in a scene. When two or more structured light-based depth cameras project a pattern of points onto a scene, their patterns may interfere. Attempts to mitigate interference either do not allow for foil cancellation of interference or may work for a limited number of simultaneously operating cameras. Moreover, such approaches involve synchronization between the different 3D cameras, and such synchronization may not always be available or desired.

As shown in a diagram, 100, an example system 112 for coordination of multiple structured light-based 3D image detectors may include a controller 102 and an imaging subsystem 114. The imaging subsystem 114 may include a depth map extraction module 104, a pattern generator 108, a projector 110, and one or more image detectors 106. The controller 102 may provide instructions to the components of the imaging subsystem 114, receive depth extraction information, and communicate with external systems to provide a depth map or other information associated with generation of a depth map for 3D imaging. The external systems (not shown) may include other components, controllers, servers, computers, or robotic systems. The pattern generator 108 may generate distinct patterns (for example, geometric shapes) associated with each of the one or more image detectors 106 based on instructions from the controller 102 and provide the patterns to the projector 110 to be projected onto a surface 122 of a target object 120. In a basic example, the pattern generator 108 may be a device or module that presents geometrical shapes over a transparent background in front of a light source such that when light is projected onto the surface 122, the geometric shapes are projected onto the surface 122 as well. The patterns may include multiple pattern elements such as geometric elements (for example, dashes, dots, or more complex elements like characters). One or more identifiers associated with the image detectors may be encoded into the patterns using the pattern elements. For example, one or more of a placement, a shape, a size, and a color of the pattern elements may be used to encode identifier information. In a basic example scenario, a dot may identify a first image detector, a dash may identify a second image detector, etc.

In one example, the patterns may include lines and the pattern elements may include one or more of line segments and dots. In the images captured by the one or more image detectors 106, a spacing between the pattern elements may be analyzed by the depth extraction module 104 to decode the one or more identifiers. For example, each line of the projected pattern may include dots, where the dots are separate at different and pre-arranged spacing. The spacing between the dots may encode binary information (spacing between two dots below a predefined threshold corresponds to "0" and spacing between two dots above a predefined threshold corresponds to "1"). Thus, the encoded binary information may be decoded by the one or more image detectors 106 to determine a binary identifier of a given length. In addition to the lines, the pattern elements may also include curves, polygonal shapes, conic section shapes, or comparable shapes. The one or more identifiers may also identify one or more projectors (in configurations with multiple projectors), as well as, the patterns themselves.

Figure 2:
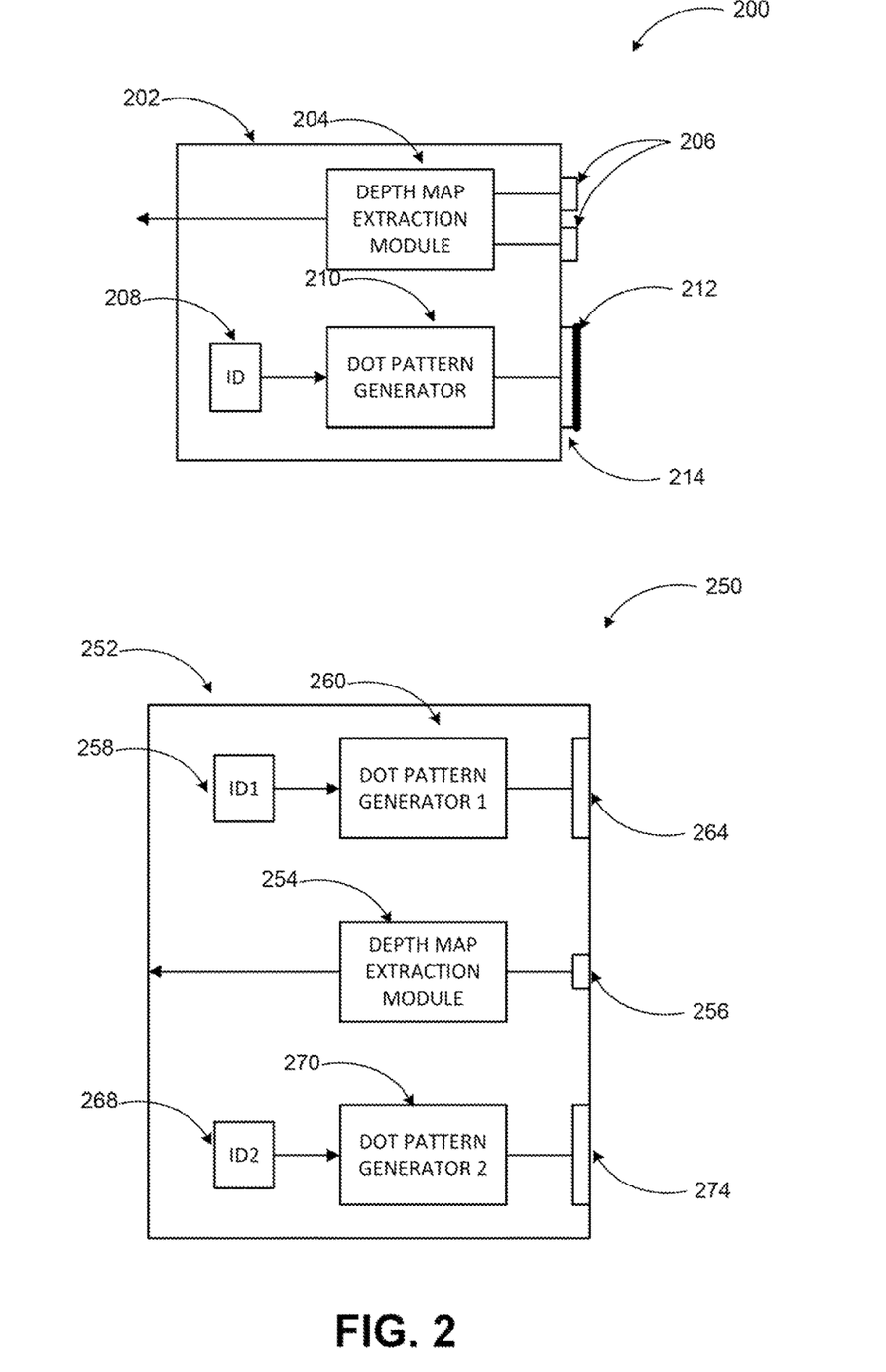
FIG. 2 illustrates an example structured light-based depth camera that is capable of operating with multiple depth cameras in a scene and an example architecture of a depth camera that uses multiple projectors and a single image sensor.

FIG. 2 illustrates an example structured light-based depth camera that is capable of operating with multiple depth cameras in a scene and an example architecture of a depth camera that uses multiple projectors and a single image sensor, arranged in accordance with at least some embodiments described herein.

As shown in a diagram 200, an example depth camera 202 may include a dot pattern generator 210 coupled to a projector 214. The dot pattern generator 210 may encode an identifier 208 into the patterns of dots projected by the projector 214 as discussed above. The depth camera 202 may also include image detectors 206 arranged to acquire an image of a scene onto which the patterns of dots may be projected. The image detectors 206 may record the dots projected onto the scene. The dots may serve as reference points in the scene such that a depth map extraction module 204 can extract a depth map through parallax techniques, for example. The light corresponding to each of the dots projected onto the scene by the dot pattern generator 210 may pass an image plane at a particular coordinate.

A diagram 250 shows another example architecture with multiple projectors and a single image detector. The example configuration may include dot pattern generators 260 and 270 coupled, respectively, to spatially separated projectors 264 and 274. The dot pattern generators 260 and 270 may encode identifiers 258 and 268, respectively, into patterns generated by the dot pattern generators 260 and 270 as described herein. Thus, the projectors 264 and 274 may be identified through the projected patterns. The projected patterns may overlap at the scene. An image detector 256 may record the projected pattern and separate the patterns, for example, through filtering. A depth map extraction module 254 may determine 3D features of the scene based on information recorded by the image detector 256. In some embodiments, a position of the projectors 264 and 274 inside a depth camera 252 may be calibrated, which may allow depth images to be extracted by using parallax principles between the dots projected by different projectors. Thus, through a single image sensor a precision of depth extraction may be improved by using multiple projectors. In further embodiments, the spatially separated projectors may be placed outside the depth camera 252. For example, the projectors may be placed in an environment where robot manipulators operate. The robot manipulators may extract the identifiers of the projected geometrical shapes corresponding to the dot patterns. From the identifiers, a location of the projectors may be looked-up in a database or similar storage. When dots of multiple projectors on a single target object are detected, a depth/distance to the target object may be resolved. In case of overlapping patterns, once a first pattern is identified (and encoded identifier decoded), the first pattern may be filtered out to identify and decode remaining patterns.

Figure 3:
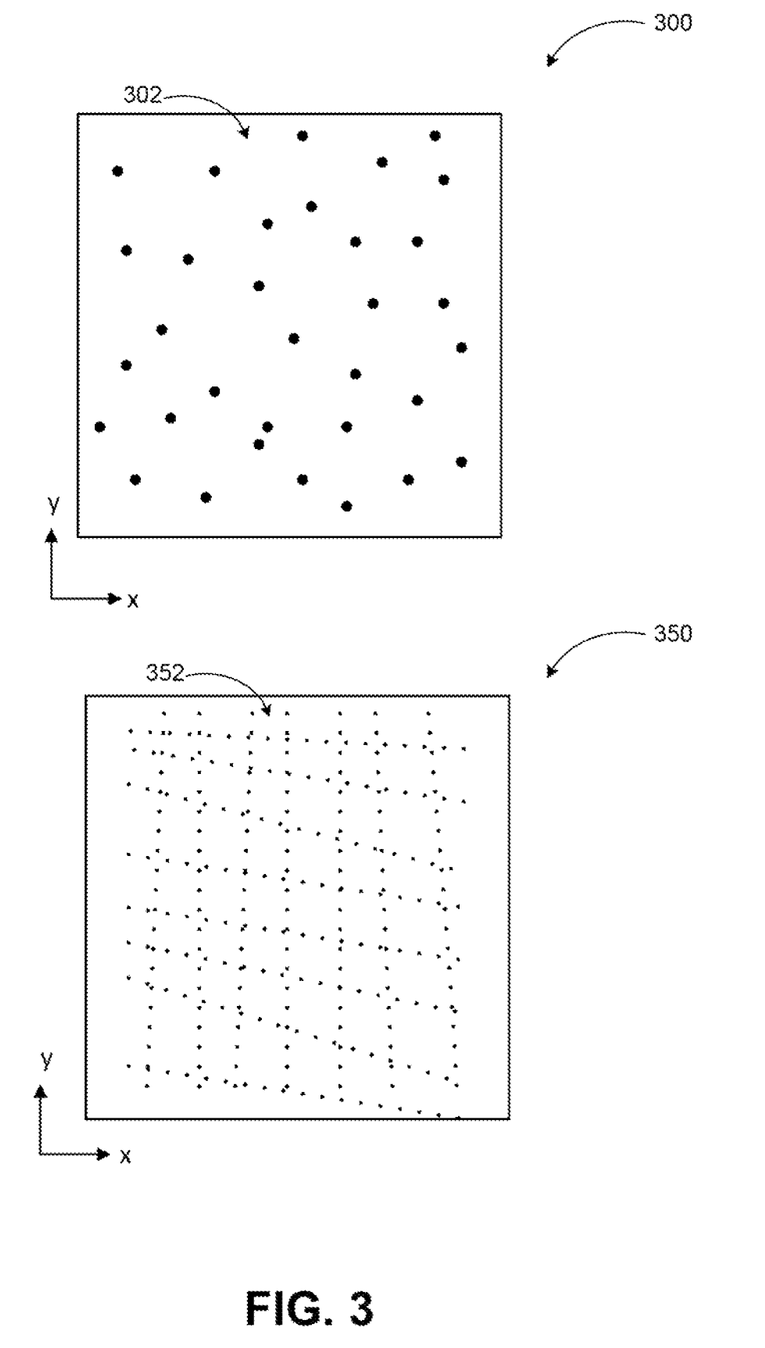
FIG. 3 illustrates example projected light patterns as detected at an image plane.

FIG. 3 illustrates example projected light patterns as detected at an image plane, arranged in accordance with at least some embodiments described herein.

As shown in a diagram 300, a pattern of dots 302 may be observed at the image plane 212 of the depth camera 202. The pattern of dots 302 generated by the dot pattern generator 210 may satisfy a constraint that may allow multiple cameras to operate simultaneously. The light corresponding to each of the dots projected onto the scene by the dot pattern generator 210 may pass the image plane 212 at a coordinate (x, y). The dot pattern may be defined by a set of coordinates S, where the coordinate (x, y) corresponds to a dot in the image plane 212. The dot pattern shown in the diagram 300 includes N=33 dots. The dot pattern may be defined by a set S that includes 33 coordinates, where each coordinate corresponds to the spatial position of the corresponding dot in the image plane 212.

For a structured light-based depth camera to operate successfully with dot patterns, a majority of the dots may need to be identified in the image captured by the image detector(s). When multiple projectors project a dot pattern onto a scene, it may be difficult to determine which dot originates from which projector. In some embodiments, N dots of a dot pattern projected onto a scene may be divided into K disjoint subsets. Each of the dots in a subset may satisfy the constraint that the dot lies on a predefined geometrical shape. Within such a constraint, there may still be degrees of freedom available, and these degrees of freedom may be used to encode an identifier. For example, an exact position of the dots on the geometrical shape may be modulated. That way, each subset of dots may encode the identifier of the projector.

As shown in a diagram 350, a dot pattern projected onto a scene may include a set of lines 352, where each of the lines include a number of dots. A particular geometrical shape may be selected such that the shape may be detectable in an image recorded by an image detector even when it is distorted by the projection. A geometrical shape may be selected, for example, that is invariant to rotation and skew. An example of such a shape may be a line. In some examples, a shape may still be deformed by the edge of a target object, for example. In the example case of a line as the geometrical shape, the line may bend along the object. The two parts of the line may still be defected, and the identifier extracted. Moreover, the identifier may be encoded multiple times into a geometrical object. In such cases when parts of a geometrical shape are detected, the identifier may be extracted from the part(s).

Another criterion that may be used to select the geometrical shape may be that when multiple geometrical shapes overlap, they may still be detectable individually. While this is clearly the case for the line, other suitable geometrical shapes may include a circle and an ellipse. When geometrical shapes overlap, there may be some interference, which may play a role when the identifier is extracted from the geometrical shape. However, the identifier may be encoded with protection against errors in the form of error-correction codes, for example, allowing for some interfering dots while the identifier is still decodable.

Figure 4:
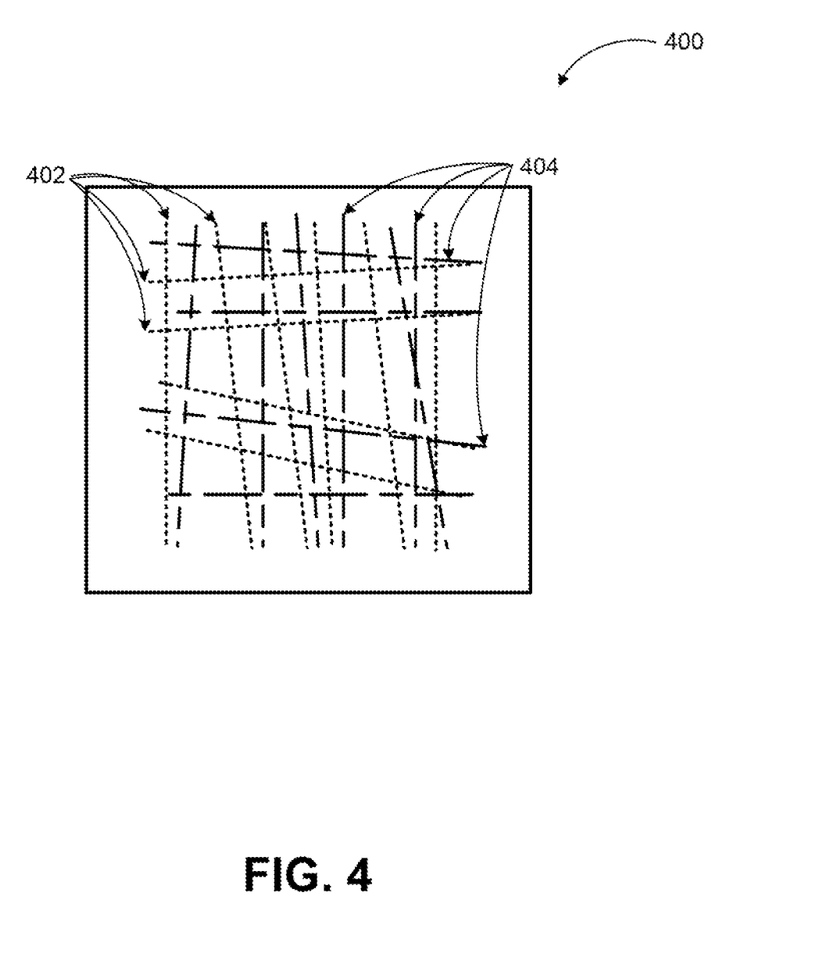
FIG. 4 illustrates an example of an overlapping dot pattern resulting from the independent projection of by two dot patterns by two depth cameras.

FIG. 4 illustrates an example of an overlapping dot pattern resulting from the independent projection of by two dot patterns by two depth cameras, arranged in accordance with at least some embodiments described herein.

As shown in a diagram 400, a first projector may project a dot pattern 402 that includes lines with short dashes. A second projector may project a dot pattern 404 that includes lines with long dashes. As illustrated in the diagram 400, the lines may still be detected by image processing algorithms even while the patterns overlap. Once the individual lines are detected, the dots on the line may be extracted, and from the relative positions of the dots, the identifiers of the projectors may be extracted.

In a scene where multiple depth cameras operate, the dot patterns projected by the different projectors may need to be different. The geometrical shapes of patterns projected by the different projectors may need to be projected at different positions. To project the patterns at different positions, a set of suitable non-overlapping patterns may be predefined. Each of the patterns may then not only encode the projector identifier, but may also encode an identifier for the pattern. That way, a depth camera may determine which patterns are already in use by analyzing an image of the scene.

Figure 5:
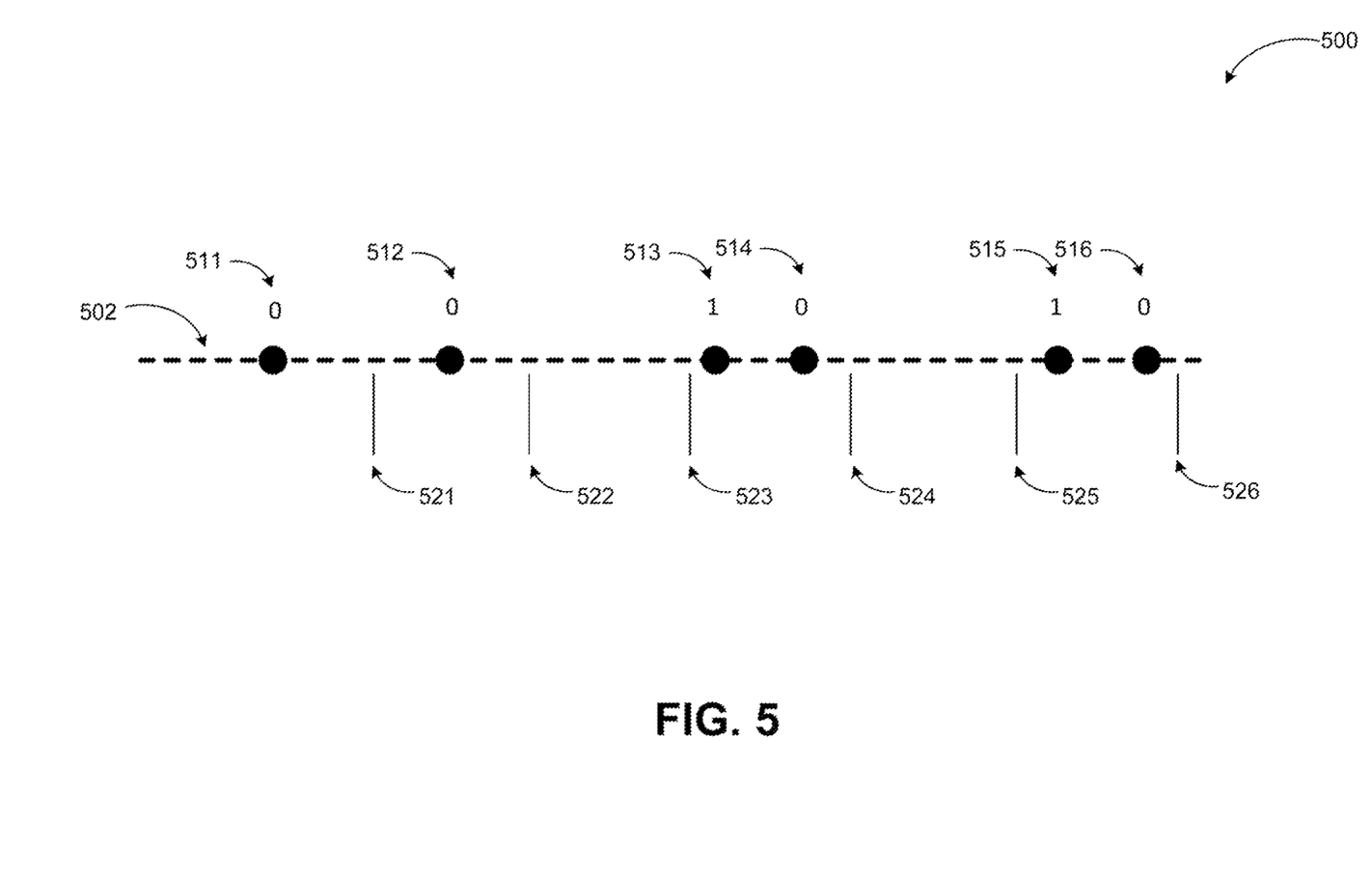
FIG. 5 illustrates an example of encoding information into the positions of dots on a geometrical shape (line)

FIG. 5 illustrates an example of encoding information into the positions of dots on a geometrical shape (line), arranged in accordance with at least some embodiments described herein.

As mentioned previously, a dot pattern may include N dots in total, which may be divided into K subsets of dots. Each of these subsets may be denoted a Si for i=0, . . . , K−1. Each of the subsets, Si, may be bound to a geometrical shape such as a line 502 shown in a diagram 500. Because a geometrical shape is typically defined for a continuum of points, there may be degrees of freedom to place the dots on the geometrical shape. The degrees of freedom may be exploited to encode the identifier into the locations of the dots on the geometrical shape.

In an example configuration, the geometrical shape may be defined by functions x(t), y(t) for t in the interval [0,1]. It may be assumed that when t runs from 0 to 1, the whole geometrical shape is traversed, and x(t) and y(t) define an x and y coordinate of the geometrical shape, respectively. Given a subset of dots Si, each of the elements of Si may be associated with a particular value of t. Thus, each dot in Si may be assigned to a particular location on the geometrical shape. Information (for example, identifiers) may be encoded into the locations of the dots on the geometrical shape in a number of ways. For example, for a subset Si that includes Ni dots, the interval [0,1] may be divided into Ni equal parts (521 through 526). A length of each part may be given by 1/Ni. The value of t used for the jth dot in Si may be selected as j/Ni+bj/4Ni where bj is an information bit taking values in {−1,1}. Thus, a set of Ni bits (511 through 516) may be encoded into the positions of the dots. In some examples, the number Ni may be selected in such a way that Ni is large enough to hold an identifier one or multiple times.

The example encoding in the diagram 500 illustrates a case where six dots are encoded into a line pattern. The positions of the dots may be varied according to the identifier to be encoded. The identifier in the diagram 500 includes a bit sequence 001010. The encoding may be generated by the above described method where a 0 and 1 bit correspond to a −1 and 1, respectively. In some embodiments, additional information may be encoded as well. For example, some dots may be used to encode a pattern that may be used for synchronization or training. Such a synchronization sequence may be used to provide the value of 1/Ni, which may be used to extract the encoded information. Furthermore, the information may also be protected by an error-correction code to provide additional resilience against, interference from overlapping shapes.

Figure 6:
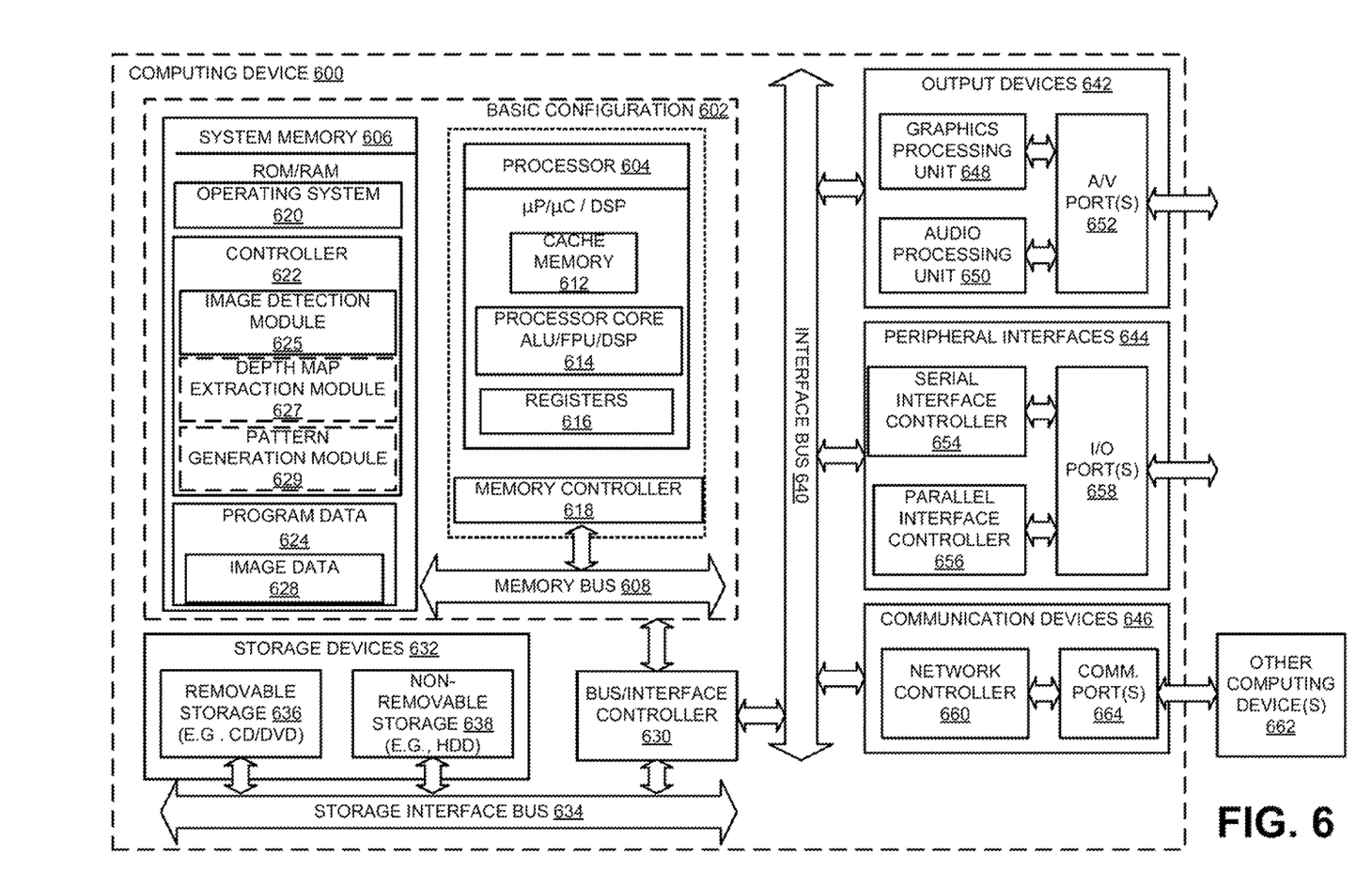
FIG. 6 illustrates a general purpose computing device, which may be used to provide coordination of multiple structured light-based 3D image detectors to extract depth maps.

FIG. 6 illustrates a general purpose computing device, which may be used to provide coordination of multiple structured light-based 3D image detectors, arranged in accordance with at least some embodiments described herein.

For example, the computing device 600 may be used to use orientation markers to determine object orientation and/or deformation as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller 622, and program data 624. The controller 622 may include an image detection module 625, a depth map extraction module 627, and a pattern generation module 629 to implement coordination of multiple structured light-based 3D image detectors as described herein. In one example configuration, the pattern generation module 629 may generate a predefined pattern of dots, which may be projected onto a scene or target object by one or snore projectors. One or more image detectors may capture an image of the scene or the target object and provide to the image detection module 625, which may analyze the captured image and provide depth information to the depth map extraction module 627, where the dots may serve as reference points in the scene such that a depth map may be extracted by the depth map extraction module 627 through parallax techniques, for example. The program data 624 may include, among other data, image data 628 to be used in recognition of objects, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disc devices such as flexible disc drives and hard-disc drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile discs (DVD), solid state drives, or other optical storage, magnetic cassettes, magnetic tape, magnetic disc storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device may include a network controller 660, which may be arranged to facilitate communications with one or more other computing devices 662 over a network communication link via one or more communication ports 664. The one or more other computing devices 662 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
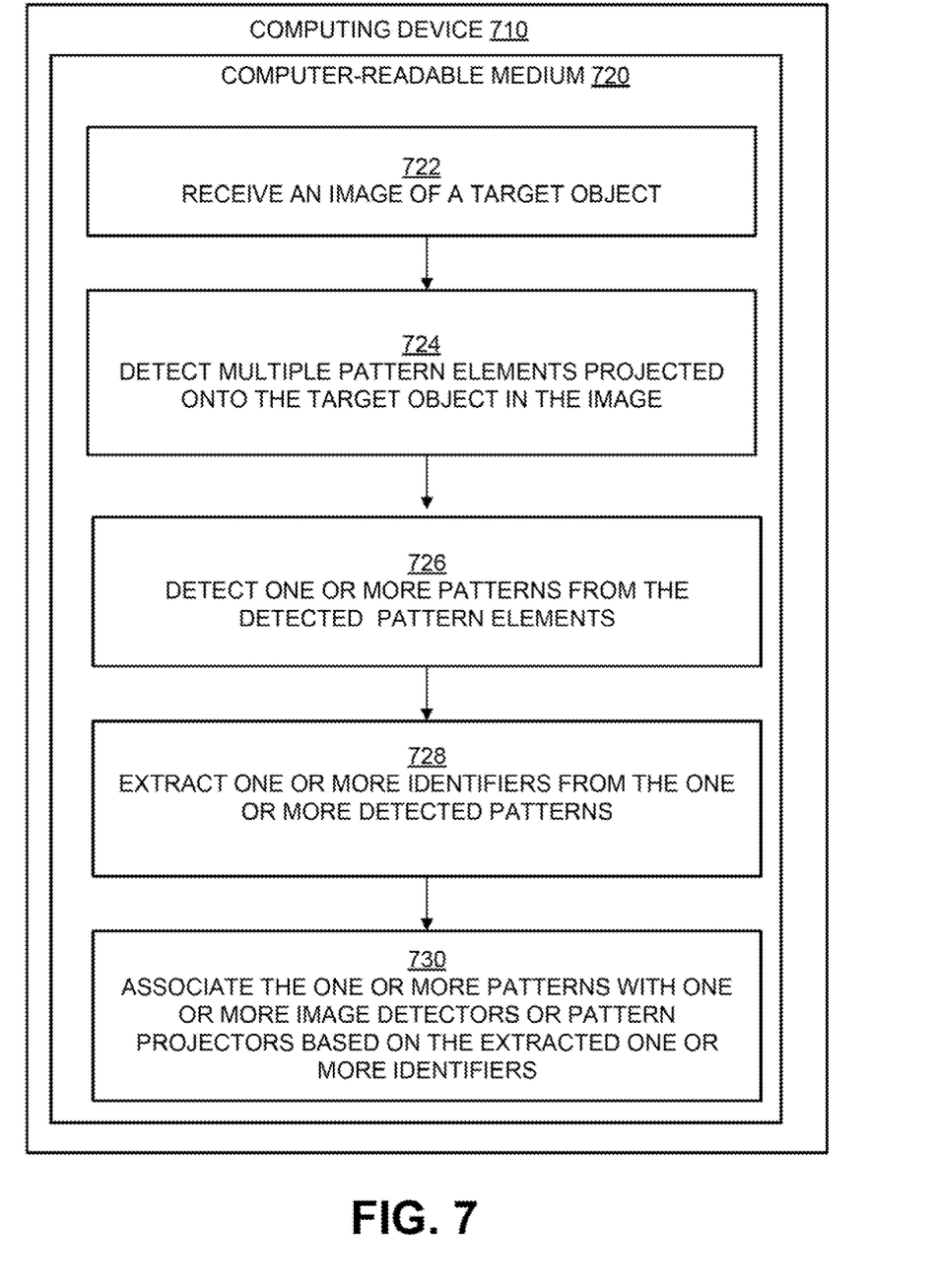
FIG. 7 is a flow diagram illustrating an example process to provide coordination of multiple structured light-based 3D image detectors for depth map extraction that may be performed by a computing device such as the computing device in FIG. 6.

FIG. 7 is a flow diagram illustrating an example process to provide coordination of multiple structured light-based 3D image detectors that may be performed by a computing device such as the computing device in FIG. 6, arranged in accordance with at least some embodiments described herein.

Example methods may include one or more operations, functions or actions as illustrated by one or more of blocks 722, 724, 726, 728, and/or 730, and may in some embodiments be performed by a computing device such as the computing device 600 in FIG. 6. The operations described in the blocks 722-730 may also be stored as computer-executable instructions in a computer-readable medium such as a computer-readable medium 720 of a computing device 710.

An example process to provide coordination of multiple structured light-based 3D image detectors may begin with block 722, "RECEIVE AN IMAGE OF A TARGET OBJECT", where the image detection module 625 may receive a captured image of the target object with a predefined pattern projected onto the target object. The image may include multiple patterns projected onto the target object by multiple projectors, for example.

Block 722 may be followed by block 724, "DETECT MULTIPLE PATTERN ELEMENTS PROJECTED ONTO THE TARGET OBJECT IN THE IMAGE", where the image detection module 625 may detect pattern elements such as dots in a set of lines or circles. The pattern elements may encode identifiers) associated with one or more projectors, image detectors, or patterns themselves.

Block 724 may be followed by block 726, "DETECT ONE OR MORE PATTERNS FROM THE DETECTED PATTERN ELEMENTS", where the image detection module 625 may detect the various patterns (for example, distinct lines, circles, arcs, etc.) each pattern including the pattern elements.

Block 726 may be followed by block 728, "EXTRACT ONE OR MORE IDENTIFIERS FROM THE ONE OR MORE DETECTED PATTERNS", where the image detection module 625 may extract the identifiers encoded onto the various patterns by the pattern elements. For example, spacing of dots or dashed on line patterns may encode identifier information as described herein.

Block 728 may be followed by block 730, "ASSOCIATE THE ONE OR MORE PATTERNS WITH ONE OR MORE IMAGE DETECTORS OR PATTERN PROJECTORS BASED ON THE EXTRACTED ONE OR MORE IDENTIFIERS", where the image detection module 625 may identify an image detector or a projector associated with each pattern projected onto the target object. Furthermore, the depth map extraction module 627 may generate a depth map based on the detection of different patterns on the target object by different image detectors (or by one image detector based on patterns from multiple projectors).

In an example scenario, a captured image may include dots projected by several projectors operating in the scene. The locations of the dots may be detected in the image by one or more image detectors through various image processing techniques. For example, the dots may be projected in a particular color and the color(s) may be used in their detection. In some cases, the dots may be projected with non-visible light such as IR. The image detector(s) may then be IR sensor(s), and the dots may be clearly be visible in the recorded image. Furthermore, background light may be suppressed by using a physical IR filter. The extracted collection of dots may be used by the image detection module to detect geometrical shapes. For example, Hough transform may be used to detect lines, circles, and ellipses in the collection of dots. Next, one or more identifiers may be extracted from each of the detected geometrical shapes. Furthermore, a subset of the dots that corresponds to the dots projected by a current projector may be identified through the extracted identifier. The subset of the dots may be used as a reference for depth estimation algorithms. Such algorithms may use parallax techniques between projector and one or multiple image sensors. Alternatively, depth from focus techniques may also be used. Moreover, for some geometrical shapes, the skew and/or deformation of the projected shape may be used to estimate depth.

The operations included in process 700 are for illustration purposes. Coordination of multiple structured light-based 3D image detectors may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples FIG. 8 illustrates a block diagram of an example computer program product, arranged in accordance with at least some embodiments described herein.

Figure 8:
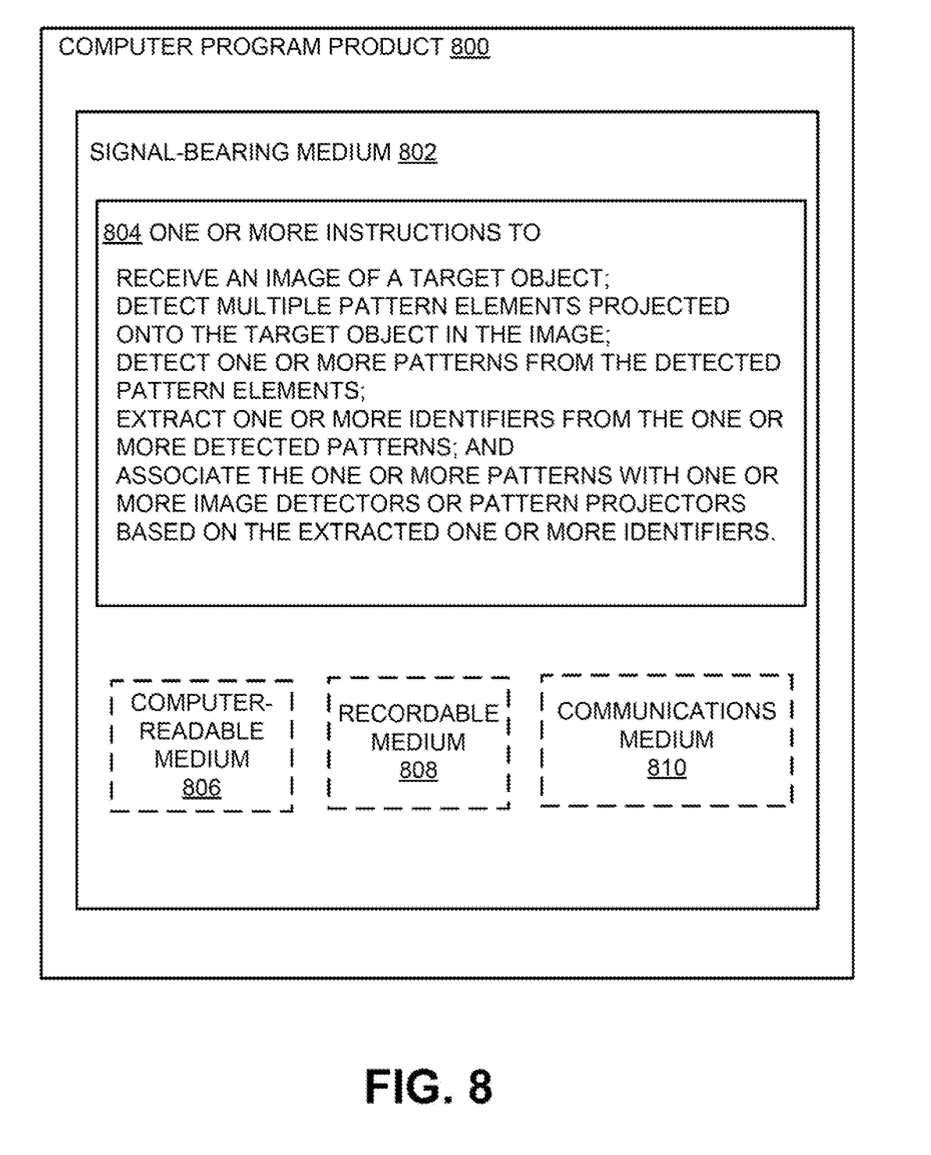
FIG. 8 illustrates a block diagram of an example computer program product, all arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the image detection module 625 and one or more of the other modules may undertake one or more of the tasks shown in FIG. 8 in response to the instructions 804 conveyed to the processor 604 by the medium 802 to perform actions associated with coordination of multiple structured light-based 3D image detectors as described herein. Some of those instructions may include, for example, instructions to receive an image of a target object; detect multiple pattern elements projected onto the target object in the image; detect one or more patterns from the detected pattern elements; extract one or more identifiers from the one or more detected patterns; and associate the one or more patterns with one or more image detectors or pattern projectors based on the extracted one or more identifiers, according to some embodiments described herein.

In some implementations, the signal bearing media 802 depicted in FIG. 8 may encompass computer-readable media 806, such as, but not limited to, a hard disc drive, a solid state drive, a compact disc (CD), a digital versatile disc (DVD), a digital tape, memory, etc. In some implementations, the signal bearing media 802 may encompass recordable media 808, such as, but not limited to, memory, read/write (R/W) CDs, R/W DVDs, etc. In some implementations, the signal bearing media 802 may encompass communications media 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 604 by an RF signal bearing medium, where the signal bearing media 802 is conveyed by the wireless communications media 810 (e.g., a wireless communications medium conforming with the IEEE 802.11 standard).

According to some embodiments, a method to coordinate multiple structured light-based 3D image detectors is described. The method may include receiving an image of a target object; detecting a plurality of pattern elements projected onto the target object in the image; detecting one or more patterns from the detected plurality of the pattern elements; extracting one or more identifiers from the one or more detected patterns; and associating the one or more patterns with one or more image detectors or pattern projectors based on the extracted one or more identifiers.

According to other examples, extracting the one or more identifiers from the one or more detected patterns may include decoding the one or more identifiers encoded into the one or more patterns through the plurality of pattern elements. The method may also include analyzing one or more of a placement, a shape, a size, and a color of the plurality of pattern elements in each of the detected one or more patterns to decode the one or more identifiers. The one or more detected patterns may include lines, the plurality of pattern elements may include one or more of line segments and dots, and the method may further include analyzing a spacing between the plurality of pattern elements to decode the one or more identifiers.

According to further examples, the plurality of pattern elements may include one of lines, curves, polygonal shapes, and conic section shapes. The one or more identifiers may identify one or more image detectors, one or more pattern projectors, or the one or more patterns. The method may also include capturing an image that includes the target object through an image detector. The method may further include in an image system with one image detector and two or more pattern projectors, identifying a pattern associated with each of the two or more pattern projectors and filtering out remaining projected patterns for each of the two or more pattern projectors; in an image system with one pattern projector and two or more image detectors, identifying a pattern associated with each of the two or more image detectors and filtering out remaining projected patterns for each of the two or more image detectors; and/or estimating a depth map associated with the target object using one or more of a stereovision detection or a depth-from-focus detection based on the association between the one or more patterns and the one or more image detectors or the one or more pattern projectors.

According to other examples, a system to coordinate multiple structured light-based 3D image detectors is described. The system may include a pattern projector configured to encode two or more image detector identifiers onto sets of plurality of patterns and project the sets of plurality of patterns onto a target object. The system may also include two or more spatially separated image detectors configured to capture an image of the target object, with the sets of plurality of patterns projected onto the target object. The system may further include a detection control module configured to receive the image of the target object with the sets of plurality of patterns projected onto the target object; detect the sets of plurality of patterns projected onto the target object; detect a plurality of pattern elements from the detected sets of plurality of patterns; extract the two or more image detector identifiers from the sets of plurality of patterns and the plurality of pattern elements; and associate each of the sets of plurality of patterns with each of the two or more image detectors based on the extracted two or more image detector identifiers.

According to yet other examples, the pattern projector may be further configured to encode the two or more image detector identifiers onto the sets of plurality of patterns using one or more of a placement, a shape, a size, and a color of the plurality of pattern elements. The detection control module may be further configured to analyze one or more of a placement, a shape, a size, and a color of the plurality of pattern elements in each of the detected sets of plurality of patterns to decode the two or more image detector identifiers, where the plurality of pattern elements include one of lines, curves, polygonal shapes, and conic section shapes. The detection control module may be further configured to filter out remaining projected patterns for each of the two or more image detectors. The detection control module may be further configured to estimate a depth map associated with the target object using one or more of a stereovision detection or a depth-from-focus detection based on the association between the sets of plurality of patterns and the two or more image detectors.

According to further examples, a system to coordinate multiple structured light-based 3D image detectors is described. The system may include two or more spatially separated pattern projectors configured to encode a plurality of identifiers onto sets of plurality of patterns, where each set of the plurality of patterns is encoded with one identifier; and project the sets of plurality of patterns onto a target object. The system may also include an image detector configured to capture an image of the target object with the sets of plurality of patterns projected onto the target object. The system may further include a detection control module configured to receive the image of the target object with the sets of plurality of patterns projected onto the target object; detect the sets of plurality of patterns projected onto the target object; detect a plurality of pattern elements from the detected sets of plurality of patterns; extract the plurality of identifiers from the sets of plurality of patterns and the plurality of pattern elements; and associate each of the sets of plurality of patterns with each of the two or more pattern projectors based on the extracted plurality of identifiers.

According to some examples, the two or more pattern projectors may be further configured to encode the plurality of identifiers onto the sets of plurality of patterns using one or more of a placement, a shape, a size, and a color of the plurality of pattern elements. The detection control module may be further configured to analyze one or more of a placement, a shape, a size, and a color of the plurality of pattern elements in each of the detected sets of plurality of patterns to decode the plurality of identifiers, where the plurality of pattern elements include one of lines, curves, polygonal shapes, and conic section shapes. The detection control module may also be configured to filter out remaining projected patterns for each of the two or more pattern projectors.

According to yet other examples, the detection control module may be further configured to estimate a depth map associated with the target object using one or more of a stereovision detection or a depth-from-focus detection based on the association between the sets of plurality of patterns and the two or more pattern projectors. The sets of plurality of patterns may include lines, the plurality of pattern elements may include dots, and the detection control module may be further configured to analyze a spacing between the plurality of pattern elements to decode the plurality of identifiers. The detection control module may be communicatively coupled to the two or more pattern projectors and the image detector, and the two or more pattern projectors and the image detector may be distinct devices.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or snore computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disc, a hard disc drive, a compact disc (CD), a digital versatile disc (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interlaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to coordinate multiple structured light-based 3D image detectors, the method comprising:
receiving an image of a target object;
detecting a plurality of pattern elements projected onto the target object in the received image, wherein the plurality of pattern elements includes one or more of a plurality of line segments and a plurality of dots;
detecting one or more patterns from the detected plurality of pattern elements;
extracting, from the detected one or more patterns, one or more identifiers encoded into the detected one or more patterns through the plurality of pattern elements;
analyzing a spacing between the plurality of pattern elements to decode the one or more identifiers; and
associating the detected one or more patterns with one or more image detectors or one or more pattern projectors based on the decoded one or more identifiers.

2. The method of claim 1, wherein the analyzing the spacing between the plurality of pattern elements comprises decoding the one or more identifiers encoded into the detected one or more patterns through the plurality of pattern elements.

3. The method of claim 2, further comprising analyzing one or more of a placement, a shape, a size, and a color of the plurality of pattern elements in each of the detected one or more patterns to decode the one or more identifiers.

4. The method of claim 3, wherein the detected one or more patterns include a plurality of lines.

5. The method of claim 2, wherein the plurality of pattern elements include one of a plurality of curves, a plurality of polygonal shapes, and a plurality of conic section shapes.

6. The method of claim 1, wherein the one or more identifiers identify one of: the one or more image detectors, the one or more pattern projectors, and the detected one or more patterns.

7. The method of claim 1, further comprising capturing an image that includes the target object through an image detector of the one or more image detectors.

8. The method of claim 1, further comprising:
in an image system with one image detector of the one or more image detectors and at least two pattern projectors of the one or more pattern projectors, identifying a pattern associated with each of the at least two pattern projectors; and
filtering out a plurality of remaining projected patterns for each of the at least two pattern projectors.

9. The method of claim 1, further comprising:
in an image system with one pattern projector of the one or more pattern projectors and at least two image detectors of the one or more image detectors, identifying a pattern associated with each of the at least two image detectors; and
filtering out a plurality of remaining projected patterns for each of the at least two image detectors.

10. The method of claim 1, further comprising estimating a depth map associated with the target object by use of one or more of a stereovision detection or a depth-from-focus detection based on the association between the one or more patterns and the one or more image detectors or the one or more pattern projectors.

11. A system to coordinate multiple structured light-based 3D image detectors, the system comprising:
a pattern projector configured to:
encode two or more image detector identifiers onto sets of plurality of patterns; and
project the sets of plurality of patterns onto a target object;
two or more spatially separated image detectors configured to:
capture an image of the target object with the sets of plurality of patterns projected onto the target object; and
a detection control module configured to:
receive the image of the target object with the sets of plurality of patterns projected onto the target object;
detect the sets of plurality of patterns projected onto the target object in the received image;
detect a plurality of pattern elements from the detected sets of plurality of patterns, wherein the plurality of pattern elements includes one or more of a plurality of line segments and a plurality of dots;
extract the two or more image detector identifiers from the detected sets of plurality of patterns and the plurality of pattern elements;
analyze a spacing between the plurality of pattern elements to decode the two or more image detector identifiers; and
associate each of the detected sets of plurality of patterns, with each of the two or more spatially separated image detectors based on the decoded two or more image detector identifiers.

12. The system of claim 11, wherein the pattern projector is further configured to encode the two or more image detector identifiers onto the sets of plurality of patterns by use of one or more of a placement, a shape, a size, and a color of the plurality of pattern elements.

13. The system of claim 11, wherein the detection control module is further configured to analyze one or more of a placement, a shape, a size, and a color of the plurality of pattern elements in each of the detected sets of plurality of patterns to decode the two or more image detector identifiers, wherein the plurality of pattern elements further include one of a plurality of curves, a plurality of polygonal shapes, and a plurality of conic section shapes.

14. The system of claim 11, wherein the detection control module is further configured to filter out remaining projected patterns for each of the two or more image detectors.

15. The system of claim 11, wherein the detection control module is further configured to estimate a depth map associated with the target object by use of one or more of a stereovision detection or a depth-from-focus detection, based on the association between the sets of detected plurality of patterns and the two or more image detectors.

16. A system to coordinate multiple structured light-based 3D image detectors, the system comprising:
two or more spatially separated pattern projectors configured to:
encode a plurality of identifiers onto sets of plurality of patterns, wherein each set of the plurality of patterns is encoded with one identifier of the plurality of identifiers; and
project the sets of plurality of patterns onto a target object;
an image detector configured to:
capture an image of the target object with the sets of plurality of patterns projected onto the target object; and
a detection control module configured to:
receive the image of the target object with the sets of plurality of patterns projected onto the target object;
detect the sets of plurality of patterns projected onto the target object in the received image;
detect a plurality of pattern elements from the detected sets of plurality of patterns;
extract the plurality of identifiers from the detected sets of plurality of patterns and the plurality of pattern elements; and
associate each of the detected sets of plurality of patterns, with each of the two or more spatially separated pattern projectors based on the extracted plurality of identifiers.

17. The system of claim 16, wherein the two or more spatially separated pattern projectors are further configured to encode the plurality of identifiers onto the sets of plurality of patterns by use of one or more of a placement, a shape, a size, and a color of the plurality of pattern elements.

18. The system of claim 16, wherein the detection control module is further configured to analyze one or more of a placement, a shape, a size, and a color of the plurality of pattern elements in each of the detected sets of plurality of patterns to decode the plurality of identifiers, wherein the plurality of pattern elements include one of a plurality of lines, a plurality of curves, a plurality of polygonal shapes, and a plurality of conic section shapes.

19. The system of claim 16, wherein the detection control module is further configured to filter out remaining projected patterns for each of the two or more spatially separated pattern projectors.

20. The system of claim 16, wherein the detection control module is further configured to estimate a depth map associated with the target object by use of one or more of a stereovision detection or a depth-from-focus detection, based on the association between the sets of plurality of patterns and the two or more spatially separated pattern projectors.

21. The system of claim 16, wherein the sets of plurality of patterns include a plurality of lines, wherein the plurality of pattern elements include a plurality of dots, and wherein the detection control module is further configured to analyze a spacing between the plurality of pattern elements to decode the plurality of identifiers.

22. The system of claim 16, wherein the detection control module is communicatively coupled to the two or more spatially separated pattern projectors and the image detector, and wherein the two or more spatially separated pattern projectors and the image detector are distinct devices.

* * * * *